(12) United States Patent
Ando et al.

(10) Patent No.: US 7,624,568 B2
(45) Date of Patent: Dec. 1, 2009

(54) VEHICLE AND CONTROL METHOD THEREOF

(75) Inventors: Ikuo Ando, Toyota (JP); Kazuki Kunishima, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 11/651,470

(22) Filed: Jan. 10, 2007

(65) Prior Publication Data

US 2007/0163234 A1 Jul. 19, 2007

(30) Foreign Application Priority Data

Jan. 19, 2006 (JP) .............................. 2006-011025

(51) Int. Cl.
*F01N 3/00* (2006.01)
(52) U.S. Cl. .............................. 60/277; 60/274; 60/280; 60/285; 180/65.1; 180/65.21; 180/65.26; 180/65.28
(58) Field of Classification Search .................. 60/274, 60/277, 280, 285, 286; 180/65.2, 65.3, 65.4, 180/65.5, 65.1, 65.21, 65.26, 65.28, 65.31
See application file for complete search history.

(56) References Cited

U.S. PATENT DOCUMENTS

| 6,148,611 | A  | * | 11/2000 | Sato .............................. 60/274 |
| 6,560,960 | B2 | * | 5/2003  | Nishimura et al. ............ 60/284 |
| 7,055,312 | B2 | * | 6/2006  | Osawa et al. ................... 60/285 |
| 7,290,387 | B2 | * | 11/2007 | Yoshioka ........................ 60/285 |
| 7,404,289 | B2 | * | 7/2008  | Miwa et al. .................... 60/285 |

FOREIGN PATENT DOCUMENTS

| JP | A 2000-45922  | 2/2000 |
| JP | A 2005-147082 | 6/2005 |

* cited by examiner

*Primary Examiner*—Binh Q Tran
(74) *Attorney, Agent, or Firm*—Oliff & Berridge, PLC

(57) ABSTRACT

When both catalyst degradation and catalyst odor need to be suppressed when a fuel cut condition is satisfied, a fuel cut control is executed giving priority to control for suppressing catalyst odor, though a required air amount G* for idling is drawn in at that time. Therefore, when shifting the engine into an idle state to suppress catalyst degradation after the catalyst odor has been eliminated, the required air amount G* for idling is already being drawn in so there is no need to adjust the air amount. As a result, there is no time delay for air amount adjustment. Therefore, after the control to suppress catalyst odor has ended, a smooth shift can be made into control to suppress degradation of the exhaust gas control catalyst.

9 Claims, 11 Drawing Sheets

VEHICLE AND CONTROL METHOD THEREOF

INCORPORATION BY REFERENCE

The disclosure of Japanese Patent Application No. 2006-011025 filed on Jan. 19, 2006, including the specification, drawings and abstract is incorporated herein by reference in its entirety.

BACKGROUND OF THE INVENTION

1. Field of the Invention

The invention relates to a vehicle and a control method thereof.

2. Description of the Related Art

Japanese Patent Application Publication No. JP-A-2005-147082, for example, describes a vehicle which includes an internal combustion engine, an exhaust gas control catalyst that purifies exhaust gas discharged from the internal combustion engine, and controlling means for performing control that basically suppresses degradation of the exhaust gas control catalyst when a condition is satisfied in which degradation of the exhaust gas control catalyst is promoted, but performs control that suppresses catalyst odor, giving priority to the control that suppresses degradation of the exhaust gas control catalyst, when a predetermined condition is satisfied in which a catalyst odor, i.e., an unpleasant sulfur odor (i.e., the odor of hydrogen sulfide) emanating from the catalyst, is given off that makes an occupant uncomfortable. During control to suppress degradation of the exhaust gas control catalyst in this vehicle, control is performed to suppress degradation of the exhaust gas control catalyst at a high temperature by prohibiting a fuel cut aimed at improving fuel efficiency while slowing down and the like. During control to suppress catalyst odor, control is performed to suppress catalyst odor caused by sulfur buildup in the exhaust gas control catalyst by performing a fuel cut giving priority to suppressing degradation of the exhaust gas control catalyst.

However, in the foregoing vehicle, when the internal combustion engine is shifted to an idle state to suppress degradation of the exhaust gas control catalyst after a fuel cut to suppress catalyst odor has ended, it is necessary to adjust the opening amount of the throttle valve so that the amount of air required for the internal combustion engine to idle in a state appropriate for the engine speed at that time is able to be drawn into the intake pipe. Therefore, in the vehicle described above, the shift into the control to suppress degradation of the exhaust gas control catalyst was not always able to be performed smoothly after control to suppress catalyst odor ended.

SUMMARY OF THE INVENTION

This invention thus aims to provide a vehicle and a control method thereof which smoothly shifts into control to suppress degradation of the exhaust gas control catalyst after the control to suppress catalyst odor has ended, giving priority to control to suppress catalyst odor over control to suppress degradation of an exhaust gas control catalyst.

Hereinafter, a vehicle and control method thereof according to an example embodiment of the invention will be described.

A first aspect of the invention relates to a vehicle that includes: an internal combustion engine that burns a mixture of air and fuel; an exhaust gas control catalyst that purifies exhaust gas discharged from the internal combustion engine; a fuel injection apparatus that injects fuel into the internal combustion engine; an air amount adjusting apparatus that adjusts the amount of air drawn into the internal combustion engine; and a control apparatus which, when a catalyst degradation condition and a catalyst odor producing condition are satisfied when a fuel cut condition is satisfied, sets a required air amount for idling based on an operating state of the vehicle, adjusts the air amount adjusting apparatus such that the required air amount is drawn in, and controls the fuel injection apparatus such that a fuel cut is performed, and when a predetermined catalyst odor eliminated condition is satisfied thereafter, controls the fuel injection apparatus and the air amount adjusting apparatus such that the internal combustion engine idles.

According to the first aspect of the invention, when a catalyst degradation condition and a catalyst odor producing condition are satisfied when a fuel cut condition is satisfied, the control apparatus sets a required air amount for idling based on the operating state of the vehicle, adjusts the air amount adjusting apparatus such that the required air amount is drawn in, and controls the fuel injection apparatus such that a fuel cut is performed. When a predetermined catalyst odor eliminated condition is satisfied thereafter, the control apparatus then controls the fuel injection apparatus and the air amount adjusting apparatus so that the internal combustion engine idles. That is, when it is necessary to suppress both catalyst degradation and catalyst odor when the fuel cut condition is satisfied, priority is given to control to suppress catalyst odor. At that time, the required air amount for idling is drawn into the internal combustion engine. As a result, when the engine shifts to an idle state in order to suppress catalyst degradation after the catalyst odor has been eliminated, the required air amount for idling is already being drawn in so there is no time delay for adjusting the air amount by the air amount adjusting apparatus. Thus, there can be a smooth shift to control to suppress degradation of the exhaust gas control catalyst after control to suppress catalyst odor has ended, while giving priority to the control to suppress catalyst odor over the control to suppress catalyst degradation.

In this case, the control apparatus may be formed of one or two or more control units.

In the first aspect of the invention, the control apparatus may make the fuel cut condition a condition in which the speed of the internal combustion engine is in a predetermined high speed region (such as at least 3500 rpm or at least 4000 rpm) and required braking torque is being generated. When the speed of the internal combustion engine is in a predetermined high speed region and the required braking torque is being generated, it is unlikely that drive torque will be required immediately thereafter so a fuel cut may be executed to improve fuel efficiency. The determination of whether the speed of the internal combustion engine is in the predetermined high speed region may be made by determining whether the difference between the actual speed and the target speed of the internal combustion engine exceeds a predetermined threshold value.

In the first aspect of the invention, the control apparatus may make the catalyst degradation condition a condition in which the temperature of the exhaust gas control catalyst has reached a predetermined high temperature region (such as at least 750 degrees Celsius or at least 800 degree Celsius). When the temperature of the exhaust gas control catalyst has reached the predetermined high temperature region, degradation of the exhaust gas control catalyst tends to be promoted when oxygen rich exhaust gas passes through it so an attempt to protect the exhaust gas control catalyst may be given priority over improving fuel efficiency.

In the first aspect of the invention, the control apparatus may make the catalyst odor producing condition a condition in which a total increase injection amount of fuel injected from the fuel injection apparatus has reached a predetermined large amount region. When the total increase injection amount of fuel has reached a predetermined large amount region, sulfur content in the fuel accumulates in the exhaust gas control catalyst such that the catalyst tends to give off a sulfurous odor (hereinafter referred to as "catalyst odor"). Therefore, an attempt to quickly eliminate the catalyst odor may be given priority over protecting the exhaust gas control catalyst. Incidentally, the relationship between the catalyst odor and the total increase injection amount may be obtained beforehand through testing or the like and the predetermined large amount region is set based on those test results, for example.

In the first aspect of the invention, the control apparatus may make the catalyst odor eliminated condition a condition in which a cumulative value of the amount of air drawn into the internal combustion engine for a period of time during which the fuel cut is performed has reached a predetermined large air amount region. When the cumulative value of the amount of air drawn into the internal combustion engine for the period of time during which the fuel cut is performed has reached a predetermined large air amount region, the sulfur content that has accumulated in the exhaust gas control catalyst can be regarded to have been discharged as a non-odorous component by oxygen in the air passing through the exhaust gas control catalyst. Therefore, the fuel cut may then be quickly stopped and the internal combustion engine made to idle in an attempt to protect the exhaust gas control catalyst. Incidentally, the relationship between the catalyst odor, which has a correlative relationship with the total increase injection amount, and the air amount necessary to eliminate that catalyst odor may be obtained through testing or the like beforehand, and the predetermined large air amount region is set based on those test results, for example.

In the first aspect of the invention, the air amount adjusting apparatus may include a throttle valve mounted such that an opening amount thereof is variable in an intake pipe of the internal combustion engine, and an actuator that changes the opening amount of the throttle valve by driving the throttle valve. In this case, it takes time to adjust the intake air amount to the required air amount so the application of the invention is highly relevant.

In the first aspect of the invention, when the control apparatus sets the required air amount for idling based on the operating state of the vehicle, adjusts the air amount adjusting apparatus such that the required air amount is drawn in, and controls the fuel injection apparatus such that a fuel cut is performed, and the required air amount enters a predetermined small amount region, the control apparatus may change the required air amount to become a value that exceeds that small amount region. Accordingly, the catalyst odor can be eliminated relatively quickly so the shift can be made to suppress degradation of the exhaust gas control catalyst. Incidentally, the relationship between the catalyst odor, which has a correlative relationship with the total increase injection amount, and the air amount necessary to eliminate that catalyst odor may be obtained through testing or the like beforehand, and the predetermined small amount region is set based on those test results, for example.

In the first aspect of the invention, when the control apparatus sets the required air amount for idling based on the operating state of the vehicle, the control apparatus may set that required air amount for idling based on the speed of the internal combustion engine. This enables the required air amount for idling of the internal combustion engine to be set appropriately.

A second aspect of the invention relates to a control method for a vehicle that includes an internal combustion engine that burns a mixture of air and fuel, an exhaust gas control catalyst that purifies exhaust gas discharged from the internal combustion engine, fuel injecting means for injecting fuel into the internal combustion engine, and air amount adjusting means for adjusting the amount of air drawn into the internal combustion engine. This control method includes the steps of: (a) when a catalyst degradation condition and a catalyst odor producing condition are satisfied when a fuel cut condition is satisfied, setting a required air amount for idling based on an operating state of the vehicle, adjusting the air amount adjusting means such that the required air amount is drawn in, and controlling the fuel injecting means such that a fuel cut is performed; and (b) when a predetermined catalyst odor eliminated condition is satisfied after step (a), controlling the fuel injecting means and the air amount adjusting means such that the internal combustion engine idles.

According to the second aspect of the invention, when a catalyst degradation condition and a catalyst odor producing condition are satisfied when a fuel cut condition is satisfied, a required air amount for idling is set based on an operating state of the vehicle, the air amount adjusting means is adjusted such that the required air amount is drawn in, and the fuel injecting means is controlled such that a fuel cut is performed. When a predetermined catalyst odor eliminated condition is satisfied thereafter, the fuel injecting means and the air amount adjusting means are then controlled such that the internal combustion engine idles. That is, when it is necessary to suppress both catalyst degradation and catalyst odor when the fuel cut condition is satisfied, priority is given to control to suppress catalyst odor. At that time, the required air amount for idling is drawn into the internal combustion engine. As a result, when the engine shifts to an idle state in order to suppress catalyst degradation after the catalyst odor has been eliminated, the required air amount for idling is already being drawn in so there is no time delay for adjusting the air amount by the air amount adjusting means. Thus, there can be a smooth shift to control to suppress degradation of the exhaust gas control catalyst after control to suppress catalyst odor has ended, while giving priority to the control to suppress catalyst odor over the control to suppress catalyst degradation. The vehicle control method according to the second aspect of the invention may also include a step(s) for realizing the operation and function displayed by the structure of the vehicle relating to the first aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments.

Figure 1:
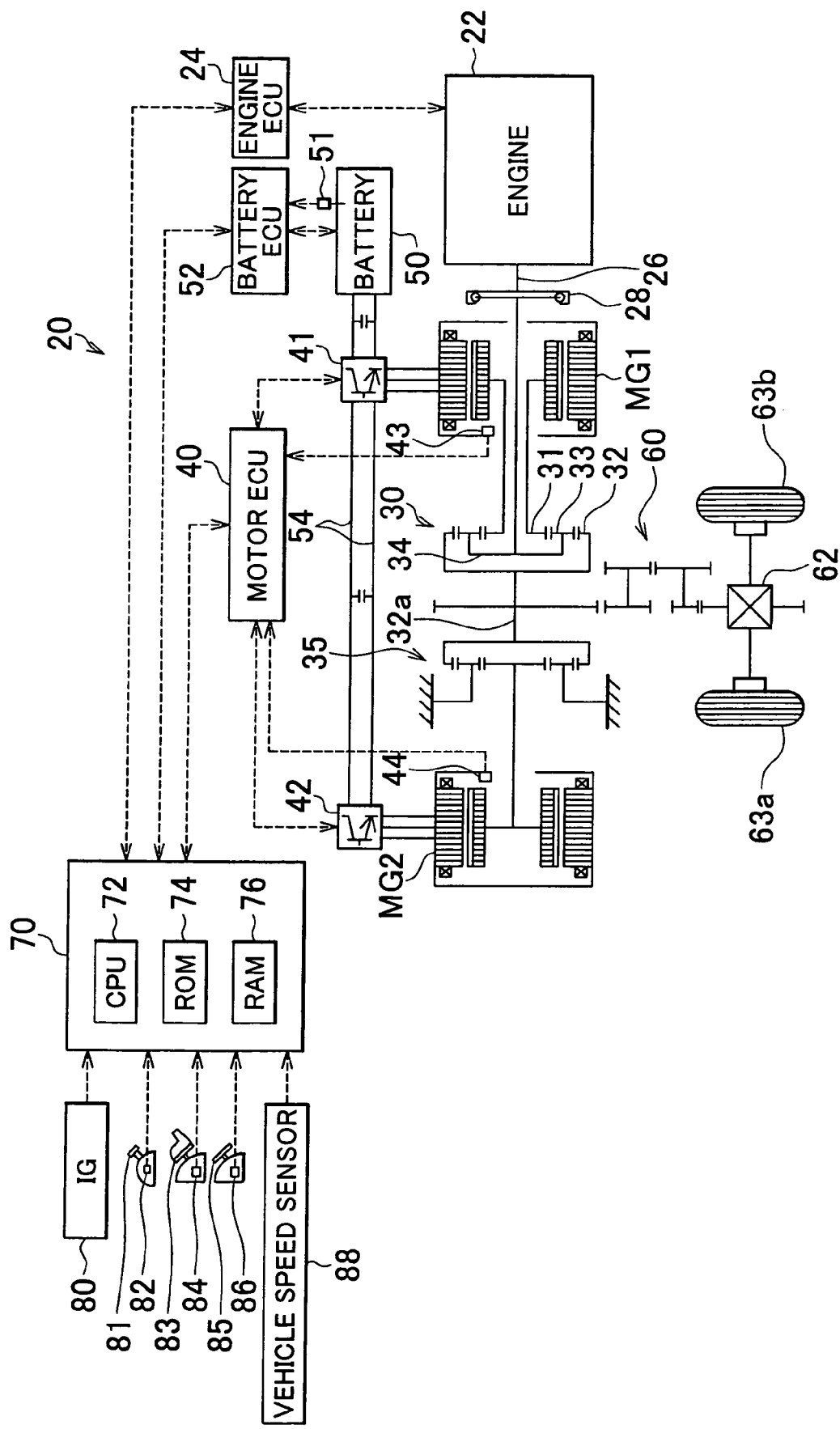
FIG. 1 is a block diagram schematically showing the structure of a hybrid vehicle according to one example embodiment of the invention.

FIG. 1 is a block diagram schematically showing the structure of a hybrid vehicle 20 according to one example embodiment of the invention. As shown in the drawing, the hybrid vehicle 20 according to this example embodiment includes an engine 22, a power split device 30 with three axles which is connected via a damper 28 to a crankshaft 26 that serves as an output shaft of the engine 22, a motor MG1 capable of generating energy which is connected to the power split device 30, a reduction gear 35 that is mounted to a ring gear shaft 32a that serves as a driveshaft which is connected to the power split device 30, a motor MG2 which is connected to the reduction gear 35, and a hybrid electronic control unit (hereinafter referred to as "hybrid ECU") 70 that controls the entire hybrid vehicle 20.

Figure 2:
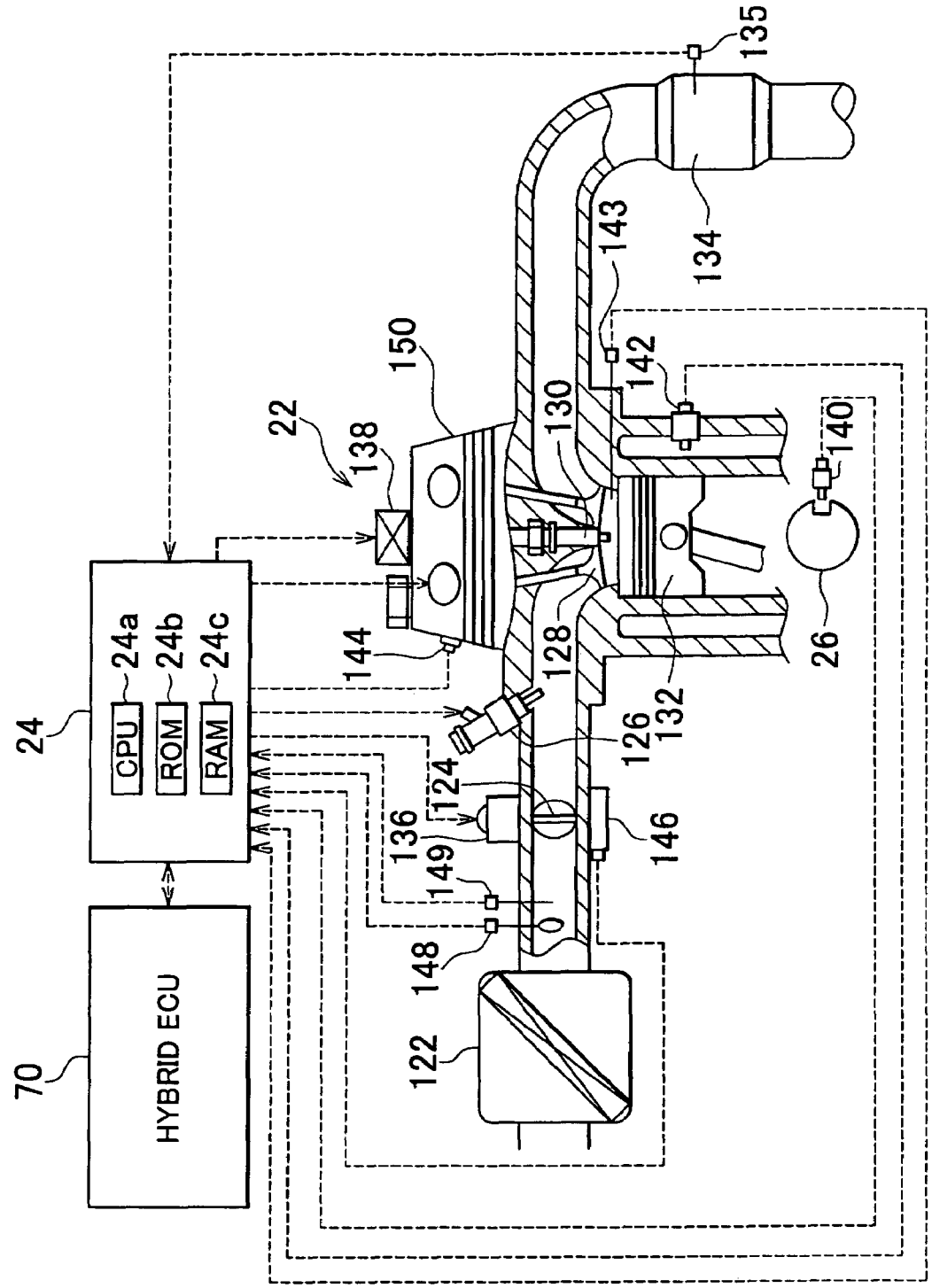
FIG. 2 is a block diagram schematically showing the structure of an engine in the hybrid vehicle shown in FIG. 1.

The engine 22 is an internal combustion engine that can output driving force using a hydrocarbon fuel such as gasoline or gas oil. As shown in FIG. 2, the engine 22 draws in air that has been cleaned by an air cleaner 122 through a throttle valve 124 while injecting gasoline from a fuel injection valve 126. The injected gasoline mixes with the drawn in air to create an air-fuel mixture which is then drawn into a combustion chamber through an intake valve 128. In the combustion chamber, the air-fuel mixture is ignited by an electric spark produced by a spark plug 130 and combusted, which produces energy that forces a piston 132 downward. The reciprocal motion of the piston 132 is converted into rotary motion of the crankshaft 26. Exhaust from the engine 22 is discharged outside through an exhaust gas control apparatus (i.e., a three-way catalyst) that purifies carbon monoxide (CO), hydrocarbons (HC), and nitrogen oxides (NOx) which are toxic components.

The engine 22 is controlled by an engine electronic control unit (hereinafter simply referred to as "engine ECU") 24. The engine ECU 24 is formed of a microprocessor that is centered around a CPU 24a. In addition to the CPU 24a, the engine ECU 24 also includes ROM 24b that stores processing programs, RAM 24c that temporarily stores data, and input/output ports and a communication port, not shown. Various signals are input via the input port to the engine ECU 24 from various sensors that detect the state of the engine 22. Some of these signals include, for example, a signal indicative of the crankshaft position from a crankshaft position sensor 140 that detects the rotational position of the crankshaft 26, a signal indicative of the coolant temperature from a coolant temperature sensor 142 that detects the temperature of coolant in the engine 22, a signal indicative of catalyst bed temperature from a temperature sensor 135 mounted to the exhaust gas control apparatus 134, a signal indicative of in-cylinder pressure from a pressure sensor 143 mounted inside the combustion chamber, and a signal indicative of the cam position from a cam position sensor 144 that detects the rotational position of a camshaft that opens and closes an intake valve 128 that draws in the air-fuel mixture to the combustion chamber and an exhaust valve that discharges exhaust gas from the combustion chamber. Other signals input to via the input port to the engine ECU 24 include a signal indicative of the throttle position from a throttle valve position sensor 146 that detects the position of a throttle valve 124, an airflow meter signal from an airflow meter 148 mounted to an intake pipe, and a signal indicative of the intake air temperature from a temperature sensor 149 mounted to the same intake air pipe. Various control signals for driving the engine 22 are also output from the engine ECU 24 via the output port. Some of these signals include, for example, a drive signal output to a fuel injection valve 126, a drive signal output to a throttle motor 136 that adjusts the position of the throttle valve 124, a control signal output to an ignition coil 138 which is integrated with an igniter, and a control signal output to a variable valve timing mechanism 150 that can change the opening and closing timings of the intake valve 128. The engine ECU 24 communicates with the hybrid ECU 70 and controls the operation of the engine 22 according to control signals from the hybrid ECU 70, as well as outputs data related to the operating state of the engine to the hybrid ECU 70 when necessary.

The power split device 30 is formed by a planetary gear set which includes a sun gear 31 with external teeth, a ring gear 32 with internal teeth which is arranged on the same axis as the sun gear 31, a plurality of pinion gears 33 which are in mesh with both the sun gear 31 and the ring gear 32, and a carrier 34 which rotatably and revolvably retains the plurality of pinion gears 33. The power split device 30 uses the sun gear 31, the ring gear 32, and the carrier 34 as rotating elements to perform a differential operation. This power split device 30 is structured such that the carrier 34 is connected to the crankshaft 26 of the engine 22, the sun gear 31 is connected to the motor MG1, and the ring gear 32 is connected via the ring gear shaft 32a to the reduction gear 35. The power split device 30 distributes power from the engine 22 that is input via the carrier 34 to both the sun gear 31 and the ring gear 32 at the corresponding gear ratio when the motor MG1 functions as a generator, and combines the power from the engine 22 input via the carrier 34 with the power from the MG1 input via the sun gear 31 and outputs the combined power to the ring gear 32 when the motor MG1 functions as an electric motor. The power output to the ring gear 32 is ultimately output from the ring gear shaft 32a to driven wheels 63a and 63b of the vehicle via a gear mechanism 60 and a differential gear 62.

The motor MG1 and the motor MG2 are both structured as known synchronous motor-generators capable of operating either as a generator or as an electric motor, and transfer electric power to and from a battery 50 via inverters 41 and 42. The driving of both of these motors MG1 and MG2 is controlled by a motor electronic control unit (hereinafter simply referred to as "motor ECU") 40. This motor ECU 40 receives various signals necessary to control the driving of the motors MG1 and MG2. Some of these signals include, for example, signals from rotational position detecting sensors 43 and 44 that detect the rotational positions of the rotors of the motors MG1 and MG2, and signals indicative of the phase current applied to the motors MG1 and MG2 detected by current sensors, not shown. The motor ECU 40 also outputs switching control signals to the inverters 41 and 42. The motor ECU 40 communicates with the hybrid ECU 70 and controls the driving of the motors MG1 and MG2 according to control signals from the hybrid ECU 70, as well as outputs data relating to the operating state of the motors MG1 and MG2 to the hybrid ECU 70 as necessary.

The battery 50 is controlled by a battery electronic control unit (hereinafter simply referred to as "battery ECU") 52. The battery ECU 52 receives various signals necessary to control the battery 50. Some of these signals include, for example, a signal indicative of the voltage between terminals from a voltage sensor, not shown, arranged between the terminals of the battery 50, a signal indicative of the charge and discharge of current from a current sensor, not shown, attached to a power line 54 that is connected to an output terminal of the battery 50, and a signal indicative of the battery temperature Th from a temperature sensor 51 attached to the battery 50. The battery ECU 52 calculates the state-of-charge (SOC) for controlling the battery 50, as well as calculates input/output limits Win and Wout from the calculated SOC and the battery temperature Tb, and the charge and discharge required power Pb* which is the value required to charge and discharge the battery 50. The battery ECU 52 outputs the data to the hybrid ECU 70 as necessary through communication.

The hybrid ECU 70 is formed of a microprocessor that centers around a CPU 72. In addition to the CPU 72, the hybrid ECU 70 also includes ROM 74 that stores processing programs, RAM 76 that temporarily stores data, and input/output ports and a communication port, not shown. The hybrid ECU 70 receives various signals including, for example, an ignition signal from an ignition switch 80, a signal indicative of a shift position SP from a shift position sensor 82 that detects the operating position of a shift lever 81, a signal indicative of the accelerator depression amount Acc from an accelerator pedal position sensor 84 that detects the depression amount of an accelerator pedal 83, a signal indicative of a brake pedal position BP from a brake pedal position sensor 86 that detects the depression amount of a brake pedal 85, and a signal indicative of the vehicle speed V from a vehicle speed sensor 88 via the input port. The hybrid ECU 70 is also connected via the communication port to the engine ECU 24, the motor ECU 40, and the battery ECU 52, as described above, and various control signals and data are transmitted back and forth between the hybrid ECU 70 and the engine ECU 24, the motor ECU 40, and the battery ECU 52.

The hybrid vehicle 20 according to this example embodiment having the foregoing structure calculates the torque needed to be output to the ring gear shaft 32a, which serves as the driveshaft, based on the vehicle speed V and the accelerator depression amount Acc that corresponds to the depression amount of the accelerator pedal 83 by the driver. The engine 22, the motor MG1, and the motor MG2 are then controlled such that the required power corresponding to that required torque is output to the ring gear shaft 32a. The engine 22, the motor MG1, and the motor MG2, are controlled in one of three operating modes, for example, i.e., a torque converted operating mode, a charge-and-discharge operating mode, and a motor operating mode. The torque converted operating mode is a mode which both controls the operation of the engine 22 so that the engine 22 outputs power corresponding to the required power, as well as controls the motors MG1 and MG2 so that all of the power output from the engine 22 is converted into torque by the power split device 30, the motor MG1, and the motor MG2, and then output to the ring gear shaft 32a. The charge-and-discharge operating mode is a mode which both controls the operation of the engine 22 so that the engine 22 outputs power corresponding to the sum of the required power and the power necessary to charge and discharge the battery 50, as well as controls the motors MG1 and MG2 so that the required power is output to the ring gear shaft 32a as a result of all or some of the power output from the engine 22 being converted into torque by the power split device 30, the motor MG1, and the motor MG2 with charging and discharging of the battery 50. The motor operating mode is a mode which stops operation of the engine 22 and controls the motor MG2 to output power corresponding to the required power to the ring gear shaft 32a.

Figure 3A:
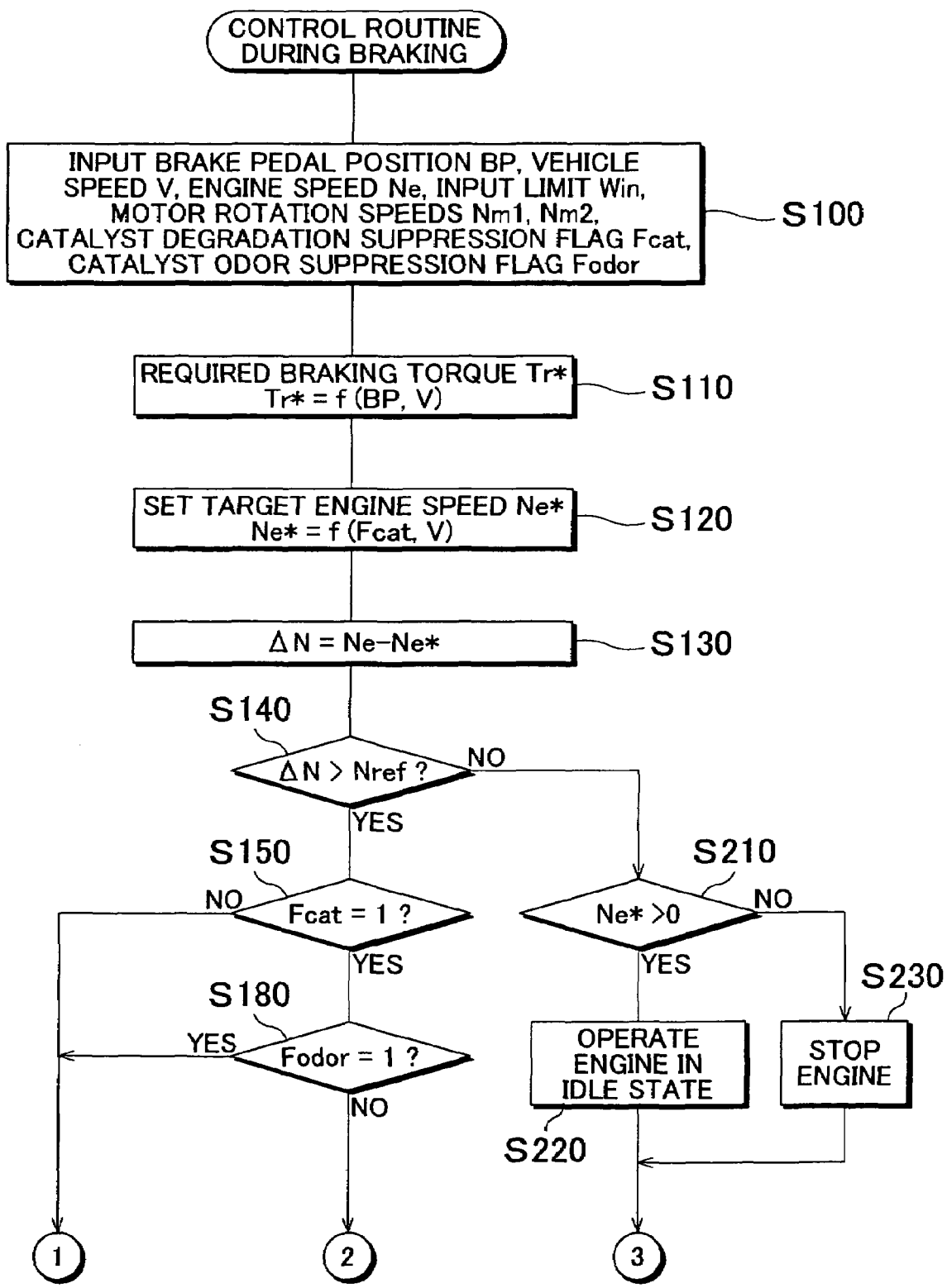
FIGS. 3A, 3B is a flowchart illustrating one example of a control routine during braking, which is executed by a hybrid electronic control unit according to the example embodiment.
Figure 3B:
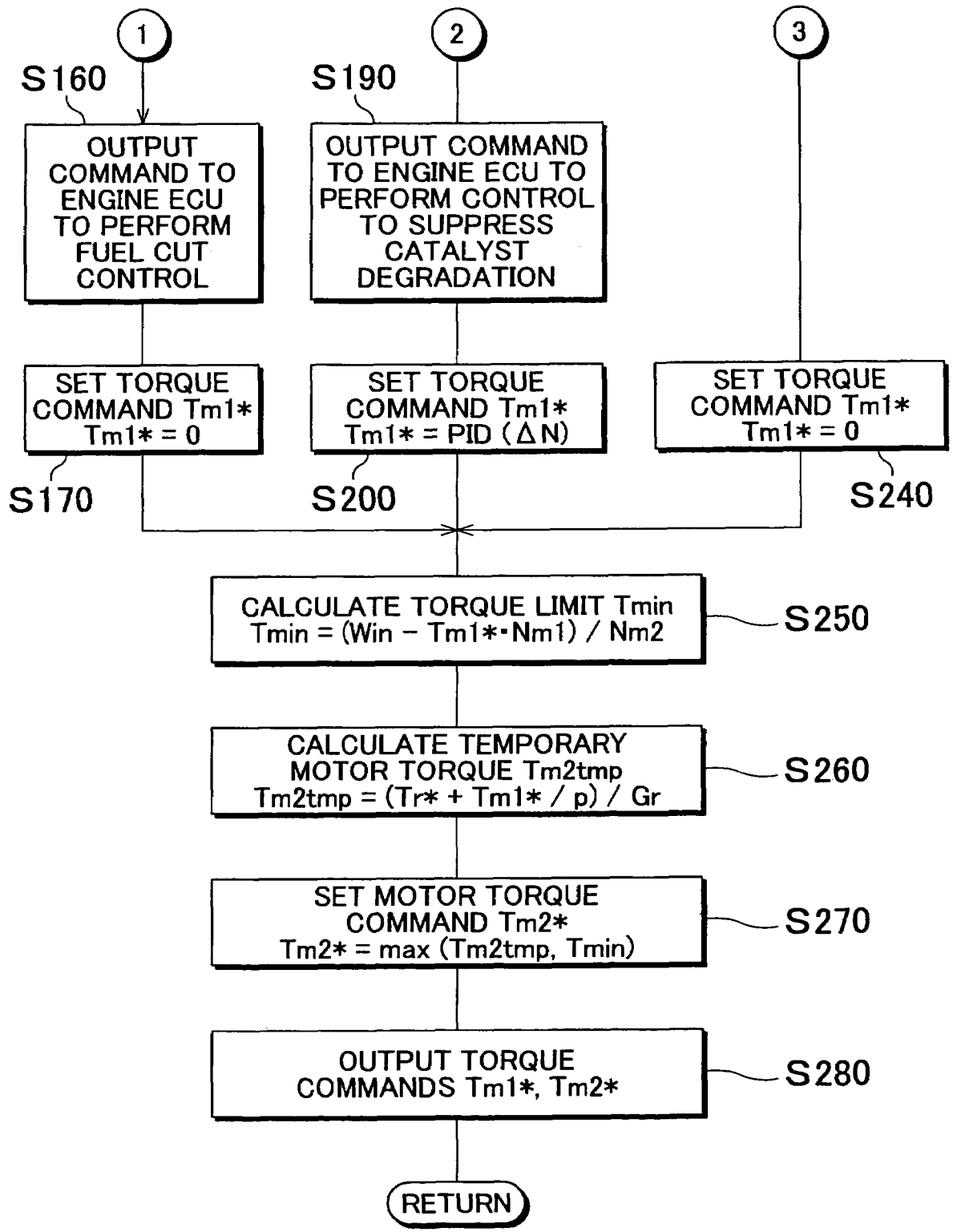

Next, operation of the hybrid vehicle 20 according to this example embodiment having the foregoing structure will be described. More specifically, operation when the driver has released the accelerator pedal 83 or depressed the brake pedal 85 such that braking force is applied and a light load is placed on the engine will be described. One example of this kind of operation is control to suppress catalyst degradation which may be performed to prevent the catalyst in the exhaust gas control apparatus 134 from being exposed to a high temperature, oxygen rich atmosphere by prohibiting a fuel cut of the engine 22 and thus keeping the engine 22 firing, even when the engine 22 is not required to generate power because the vehicle is braking or only a small amount of power is required by the vehicle. FIGS. 3A, 3B is a flowchart illustrating a control routine during braking which is executed by the hybrid ECU 70 as one example of control during braking of the vehicle which includes this kind of control to suppress catalyst degradation. This routine is repeatedly executed at predetermined intervals of time (such as every several msec) when, for example, the vehicle is being braked or a small amount of power is required for the vehicle.

When the control routine during braking is executed, the CPU 72 of the hybrid ECU 70 first performs a step of inputting data necessary for that control, e.g., the brake pedal position BP from the brake pedal position sensor 86, the vehicle speed V from the vehicle speed sensor 88, the speed Ne of the engine 22 (hereinafter simply referred to as "engine speed Ne"), the rotation speeds Nm1 and Nm2 of the motors MG1 and MG2, respectively, a catalyst degradation suppression flag Fcat, a catalyst odor suppression flag Fodor, and an input limit Win of the battery 50 and the like (step S100). Here, the engine speed Ne is calculated by the engine ECU 24 based on the signal from the crankshaft position sensor 140 that is mounted on the crankshaft 26, and input from the engine ECU 24 through communication. Also, the rotation speeds Nm1 and Nm2 of the motors MG1 and MG2 are calculated by the motor ECU 40 based on the rotational positions of the rotors of the motors MG1 and MG2 detected by the rotational position detecting sensors 43 and 44, and are input from the motor ECU 40 through communication. Further, the catalyst degradation suppression flag Fcat and the catalyst odor suppression flag Fodor are set by the engine ECU 24 and input. This catalyst degradation suppression flag Fcat is a flag that is set when the engine ECU 24 executes a routine to set the catalyst degradation suppression flag, which will be described later. When catalyst degradation needs to be suppressed, the catalyst degradation suppression flag Fcat is set to 1. When catalyst degradation does not need to be suppressed, the catalyst degradation suppression flag Fcat is reset to 0. Also, the catalyst odor suppression flag Fodor is a flag that is set when the engine ECU 24 executes a routine to set the catalyst odor suppression flag, which will be described later. When catalyst odor needs to be suppressed, the catalyst odor suppression flag Fodor is set to 1. When catalyst odor does not need to be suppressed, the catalyst odor suppression flag Fodor is reset to 0. The input limit Win of the battery 50 is set by the battery ECU 52 based on the SOC of the battery 50 and input from the battery ECU 52 through communication.

Figure 4:
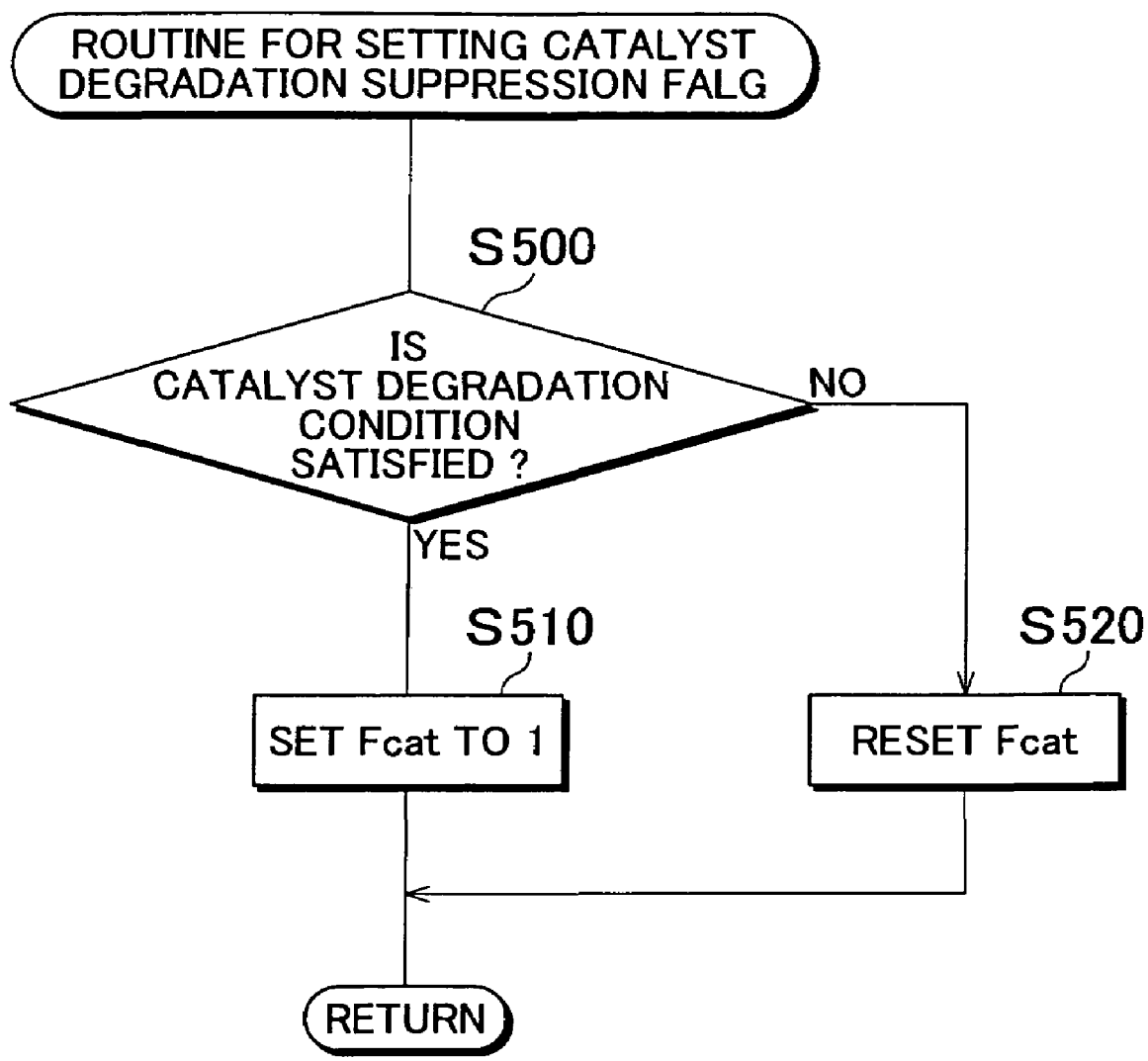
FIG. 4 is a flowchart illustrating an example of a routine for setting a catalyst degradation suppression flag which is executed by an engine electronic control unit according to the example embodiment.
Figure 5:
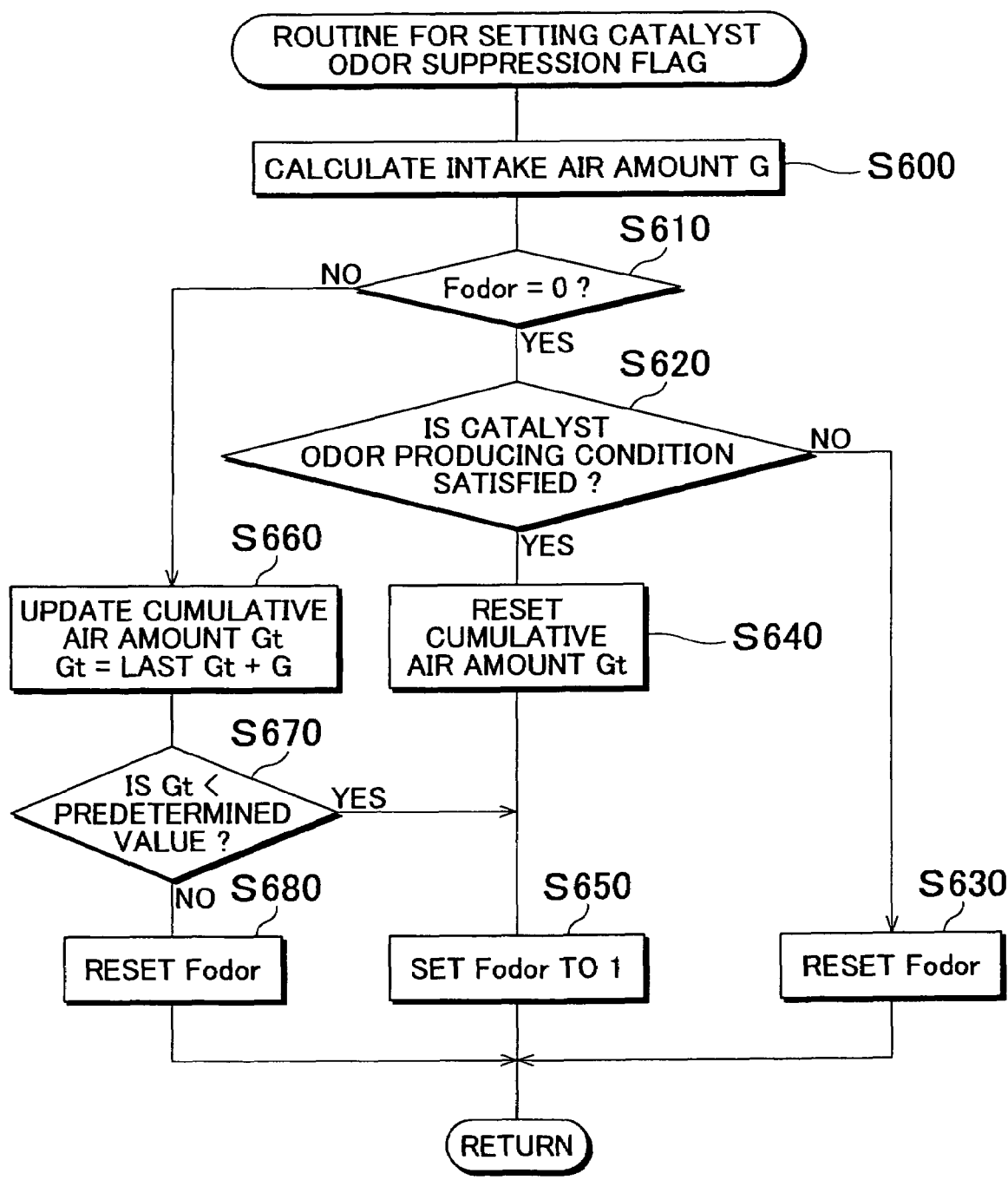
FIG. 5 is a flowchart illustrating an example of a routine for setting a catalyst odor suppression flag which is executed by the engine electronic control unit according to the example embodiment.

Here, the routine for setting the catalyst degradation suppression flag and the routine for setting the catalyst odor suppression flag that are executed at predetermined intervals of time (such as every few msec) by the engine ECU 24 will be described. FIG. 4 is a flowchart illustrating one example of the routine for setting the catalyst degradation suppression flag, and FIG. 5 is a flowchart illustrating one example of the routine for setting the catalyst odor suppression flag. When the routine for setting the catalyst degradation suppression flag shown in FIG. 4 is executed, the CPU 24a of the engine ECU 24 determines whether a condition in which the catalyst is degraded is satisfied (step S500). If that condition is satisfied, i.e., if the catalyst is degraded, the catalyst degradation suppression flag Fcat is set to 1 (step S510) indicating that catalyst degradation needs to be suppressed. If that condition is not satisfied, i.e., if the catalyst is not degraded, the catalyst degradation suppression flag Fcat is set to 0 (step S520) indicating that catalyst degradation does not need to be suppressed. After the value of the catalyst degradation suppression flag Fcat is set in this way, this cycle of the routine ends. Here, the condition in which the catalyst is degraded is assumed to be satisfied when the catalyst bed temperature indicated by the temperature sensor 135 mounted to the exhaust gas control apparatus 134 is equal to or greater than a predetermined temperature. This predetermined temperature is a value that is near a lower limit value in a high temperature region in which the catalyst that constitutes the exhaust gas control apparatus 134 will degrade if exposed to an oxygen rich atmosphere, and is set at 750 or 800 degrees Centigrade, for example. On the other hand, when the routine for setting the catalyst odor suppression flag shown in FIG. 5 is executed, the CPU 24a of the engine ECU 24 calculates the intake air amount G drawn into the engine 22 based on the airflow meter signal from the airflow meter 148 (step S600). Next, the CPU 24a determines whether the current catalyst odor suppression flag Fodor is 0 (step S610). If the current catalyst odor suppression flag Fodor is 0, then the CPU 24a determines whether a condition in which catalyst odor is produced is satisfied (step S620). In this example embodiment, the determination as to whether catalyst odor producing condition is satisfied is made by determining whether a fuel increase correction was executed at a point prior to the start of this routine, and if so, whether the total amount of that increase correction reached a predetermined large amount region. The increase correction refers to using the product of the normal fuel injection quantity multiplied by a correction coefficient (>1.0) as the fuel injection quantity, and is executed in order to cool the exhaust gas control apparatus 134 or increase the output from the engine 22, for example. In the case of the former, the exhaust gas control apparatus 134 is cooled by the decrease in combustion temperature which occurs due to a drop in combustion efficiency from the lack of oxygen and the vaporization heat of the increased fuel amount. In the case of the latter, power output from the engine 22 is increased by controlling the air-fuel ratio so that it becomes richer than the stoichiometric air-fuel ratio. Also, the total amount of the increase correction is calculated as the cumulative value, i.e., the product of the correction coefficient during an increase correction and the period of time for which the increase correction was executed. There is a correlation between the production of catalyst odor (i.e., the odor of hydrogen sulfide) and the sulfur content in the fuel. From this, the relationship between the total amount of increase correction and the production or absence of catalyst odor is obtained in advance through experimentation or the like. The predetermined large amount region is set based on that relationship. If the catalyst odor producing condition is not satisfied, the catalyst odor suppression flag Fodor is reset to 0 (step S630) and this cycle of the routine ends. On the other hand, if the catalyst odor producing condition is satisfied, the cumulative air amount Gt is reset to 0 (step S640) and the catalyst odor suppression flag Fodor is set to 1 (step S650), after which this cycle of the routine ends. Here, the cumulative air amount Gt is the cumulative value of the air drawn in during the period for which control to suppress catalyst odor is executed. Returning now to step S610, if the catalyst odor suppression flag Fodor is 1, it is assumed that control to suppress catalyst odor (i.e., a fuel cut) is currently being executed so the cumulative air amount Gt when this routine was executed the last time is added to the current intake air amount G and the sum is then set as the new cumulative air amount Gt (step S660). The CPU 24a then determines whether that cumulative air amount Gt has reached a predetermined value that is sufficient for discharging the sulfur content outside as a non odorous component (step S670). If the cumulative air amount Gt has not reached that predetermined value, it is determined that the catalyst odor still needs to be suppressed so the catalyst odor suppression flag Fodor is set to 1 (step S650) after which this cycle of the routine ends. If, on the other hand, the cumulative air amount Gt has reached the predetermined value, it is determined that the catalyst odor does not need to be suppressed so the catalyst odor suppression flag Fodor is reset to 0 (step S680) and this cycle of the routine ends.

Figure 6:
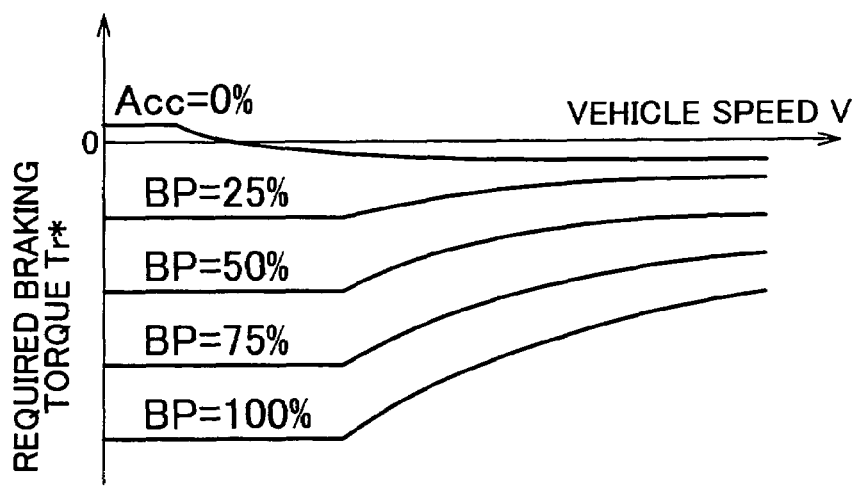
FIG. 6 is a chart showing an example of a map used for setting required braking torque.

Returning now to FIGS. 3A, 3B, once the various data is input in step S100, the CPU 72 sets the required braking torque Tr* to be output as braking torque required by the vehicle to the ring gear shaft 32a which serves as the driveshaft and is connected to the driven wheels 63a and 63b, based on the vehicle speed V and the brake pedal position BP that are input (step S110). In this example embodiment, the relationship between the brake pedal position BP, the vehicle speed V, and the required braking torque Tr* is set and stored in the ROM 74 in advance in the form of a map for setting the required braking torque. The CPU 72 sets the required braking torque Tr* by calculating the corresponding required braking torque Tr* from the stored map when the brake pedal position BP and the vehicle speed V are applied. FIG. 6 shows one example of the map for setting the required braking torque.

Continuing on, the CPU 72 sets a target speed Ne* of the engine 22 (hereinafter referred to simply as "target engine speed Ne*") based on the catalyst degradation suppression flag Fcat and the vehicle speed V (step S120). In this example embodiment, the target engine speed Ne* is determined according to the vehicle speed V in order to quickly output power when the accelerator pedal 83 is depressed after no power was needed from the engine 22 because the vehicle was being braked. For example, when the catalyst degradation suppression flag Fcat is 0 (i.e., there is no need for control to suppress catalyst degradation) and the vehicle speed V is below a predetermined vehicle speed (such as 10 km/h or 20 km/h), the target engine speed Ne* may be set to 0 to stop the engine 22. When the catalyst degradation suppression flag Fcat is 0 and the vehicle speed V is equal to or greater than the predetermined vehicle speed, the target engine speed Ne* may be set to a predetermined speed (such as 800 or 1000 rpm). When the catalyst degradation suppression flag Fcat is 1 (i.e., there is a need for control to suppress catalyst degradation), the target engine speed Ne* may be set to a predetermined speed (such as 800 or 1000 rpm).

Then, the CPU 72 calculates an engine speed difference ΔN between the engine speed Ne that was input and the target engine speed Ne* that was set (step S130), and compares that calculated engine speed difference ΔN with a threshold value Nref (step S140). Here, the threshold value Nref is an engine speed difference from a target engine speed Ne* that just enables the engine 22 to easily idle at the target engine speed Ne* without actively performing control to reduce the engine speed Ne using the motor MG1. This threshold value Nref is set as a relatively low value. Here, idling refers to the engine 22 operating in a state (at an engine speed Ne) in which output of the engine 22 is balanced with the friction and the like generated in the engine 22.

Figure 7:
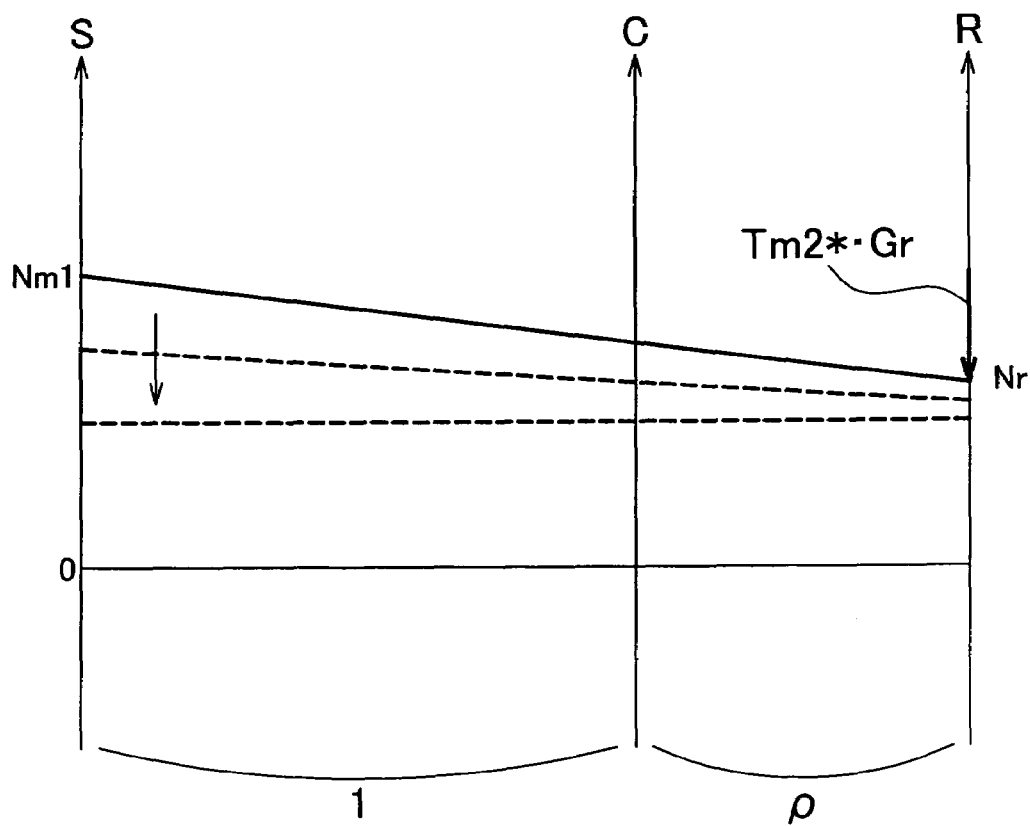
FIG. 7 is a view of one example of an alignment graph showing the mechanical relationship between torque and rotation speed of rotating elements of a power split device during braking that occurs with a fuel cut of the engine.

Now, let us assume that after the driver has depressed the accelerator pedal 83, while the vehicle speed V is relatively high with the engine 22 operating at a relatively high speed, the accelerator pedal 83 is returned from a depressed state, the driver then lightly depresses the brake pedal 85. In this case, a relatively low predetermined speed is set for the target engine speed Ne* so the engine speed difference ΔN is larger than the threshold value Nref. In this case, the fuel cut condition is satisfied. That is, in this example embodiment, the fuel cut condition is a condition that is satisfied when the engine 22 is not required to generate power because the vehicle is being braked or only a small amount of power is required by the vehicle, and the engine speed difference ΔN has exceeded the threshold value Nref. Next, it is determined whether the catalyst degradation suppression flag Fcat is 1 (step S150). When the catalyst degradation suppression flag Fcat is 0, i.e., when the fuel cut condition is satisfied and control is not necessary to suppress catalyst degradation, the CPU 72 outputs a control signal to the engine ECU 24 to execute fuel cut control that temporarily stops the supply of fuel to the engine 22 (step S160), and sets a torque command Tm1* for the motor MG1 to 0 (step S170). Upon receiving this command, the engine ECU 24 executes the fuel cut control, which will be described later. After the control signal is output to the engine ECU 24 and the torque command Tm1* is set to 0, a torque limit Tmin is calculated according to Expression (1) below as a lower limit of torque that may be output from the motor MG2. This torque limit Tmin is calculated by dividing the difference between the input limit Win of the battery 50 and the consumed power (generated power) of the motor MG1 by the rotation speed Nm2 of the motor MG2 (step S250). Incidentally, the consumed power (generated power) of the motor MG1 is obtained by multiplying the calculated torque command Tm1* (in this case, 0) of the motor MG1 by the current rotation speed Nm1 of the motor MG1. In addition, a temporary motor torque Tm2tmp is calculated as the torque to be output from the motor MG2 according to Expression (2) below using the required braking torque Tr*, the torque command Tm1*, and the gear ratio ρ of the power split device 30 (step S260). A torque command Tm2* of the motor MG2 is then set as a value that limits the temporary motor torque Tm2tmp by the calculated torque limit Tmin (step S270), and the set torque commands Tm1* and Tm2* are then output to the motor ECU 40 (step S280), after which this cycle of the routine ends. Upon receiving the torque commands Tm1* and Tm2*, the motor ECU 40 switches switching elements in the inverters 41 and 42 to drive the motors MG1 and MG2 according to the torque commands Tm1* and Tm2*. FIG. 7 shows an example of an alignment graph illustrating the mechanical relationship between torque and rotation speed of the rotating elements of the power split device 30 during braking following a fuel cut of the engine 22. In the drawing, the S axis on the left represents the rotation speed of the sun gear 31 which is the rotation speed Nm1 of the motor MG1, the C axis in the middle represents the rotation speed of the carrier 34 which is the same as the engine speed Ne, and the R axis on the right represents the rotation speed Nr of the ring gear 32 which is the rotation speed Nm2 of the motor MG2 divided by the gear ratio Gr of the reduction gear 35. The bold arrow on the R axis indicates torque acting on the ring gear shaft 32a when the motor MG2 is driven using the torque command Tm2*, which will be described later. The arrow is pointing downward so the sign of the torque is negative (i.e., braking torque). Also in the drawing, the solid line is collinear when the brake pedal 85 is being depressed, and the broken lines indicate the collinear change over the time. As shown in the drawing, the engine speed Ne decreases as a result of the fuel cut. Expression (2) can easily be derived from this alignment graph.

$$Tmin = (Win - Tm1^* \times Nm1)/Nm2 \qquad (1)$$

$$Tm2tmp = (Tr^* + Tm1^*/\rho)/Gr \qquad (2)$$

If it is determined in step S150 that the catalyst degradation suppression flag Fcat is 1, i.e., if the fuel cut condition is satisfied and control is necessary to suppress catalyst degradation, then it is determined whether the catalyst odor suppression flag Fodor is 1 (step S180). If it is determined that the catalyst odor suppression flag Fodor is 0, then it is determined that it is not necessary to suppress the catalyst odor and the hybrid ECU 70 outputs a control signal to the engine ECU 24 to execute control to suppress catalyst degradation, to be described later, in order to suppress degradation of the catalyst (step S190). While the engine 22 is being controlled to idle at the engine speed Ne at that time, the torque command Tm1* (a negative value) of the motor MG1 is set according to Expression (3) below so that the engine speed Ne reaches the target engine speed Ne* (step S200). Expression (3) is a relational expression in feedback control for bringing the engine speed Ne to the target engine speed Ne* when combustion continues in the engine 22. The first term on the right side, "k1", is the gain (a negative value) of a proportional term and the second term on the right side, "k2", is the gain (also a negative value) of an integral term. These gains "k1" and "k2" are set to have small absolute values compared to when torque of a relatively large absolute value is output from the engine 22 because it is necessary to keep combustion going in the engine 22. If, on the other hand, it is determined in step S180 that the catalyst odor suppression flag Fodor is 1, then it is determined that it is necessary to execute control to suppress catalyst odor in priority to control to suppress catalyst degradation so the CPU 72 of the hybrid ECU 70 outputs a control signal to the engine ECU 24 to execute control to suppress catalyst odor, i.e., fuel cut control (step S160). After this, the torque command Tm1* of the motor MG1 is set to 0 (step S170). Upon receiving this control signal, the engine ECU 24 executes the fuel cut control, which will be described later. After the CPU 72 of the hybrid ECU 70 sets the torque command Tm1* of the motor MG1 in step S170 or S200, it sets the torque command Tm2* of the motor MG2 using the set torque command Tm1* of the motor MG1 (steps S250 to S270) and then outputs the set torque commands Tm1* and Tm2* to the motor ECU 40 (step S280), after which this cycle of the routine ends.

$$Tm1^* = k1 \times \Delta N + k2 \int \Delta N \times dt \quad (3)$$

If it is determined in step S140 that the engine speed difference ΔN is equal to or less than the threshold value Nref, the target engine speed Ne* is checked (step S210). If the target engine speed Ne* is not 0, the hybrid ECU 70 outputs a command to the engine ECU 24 to operate the engine 22 in idle state to balance out the friction and the like in the engine 22 that is operating at the target engine speed Ne* (step S220). If the target engine speed Ne* is 0, then the hybrid ECU 70 outputs a command to the engine ECU 24 to stop the engine 22 (step S230). Then, the torque command Tm1* of the motor MG1 is set to 0 (step S240) and the torque command Tm2* of the motor MG2 is set using that set torque command Tm1* of the motor MG1 (steps S250 to 270). The hybrid ECU 70 then outputs the set torque commands Tm1* and Tm2* to the motor ECU 40 (step S280), after which this cycle of the routine ends. As a result, when the target engine speed Ne* is not 0, the engine 22 idles at that engine speed.

Figure 8:
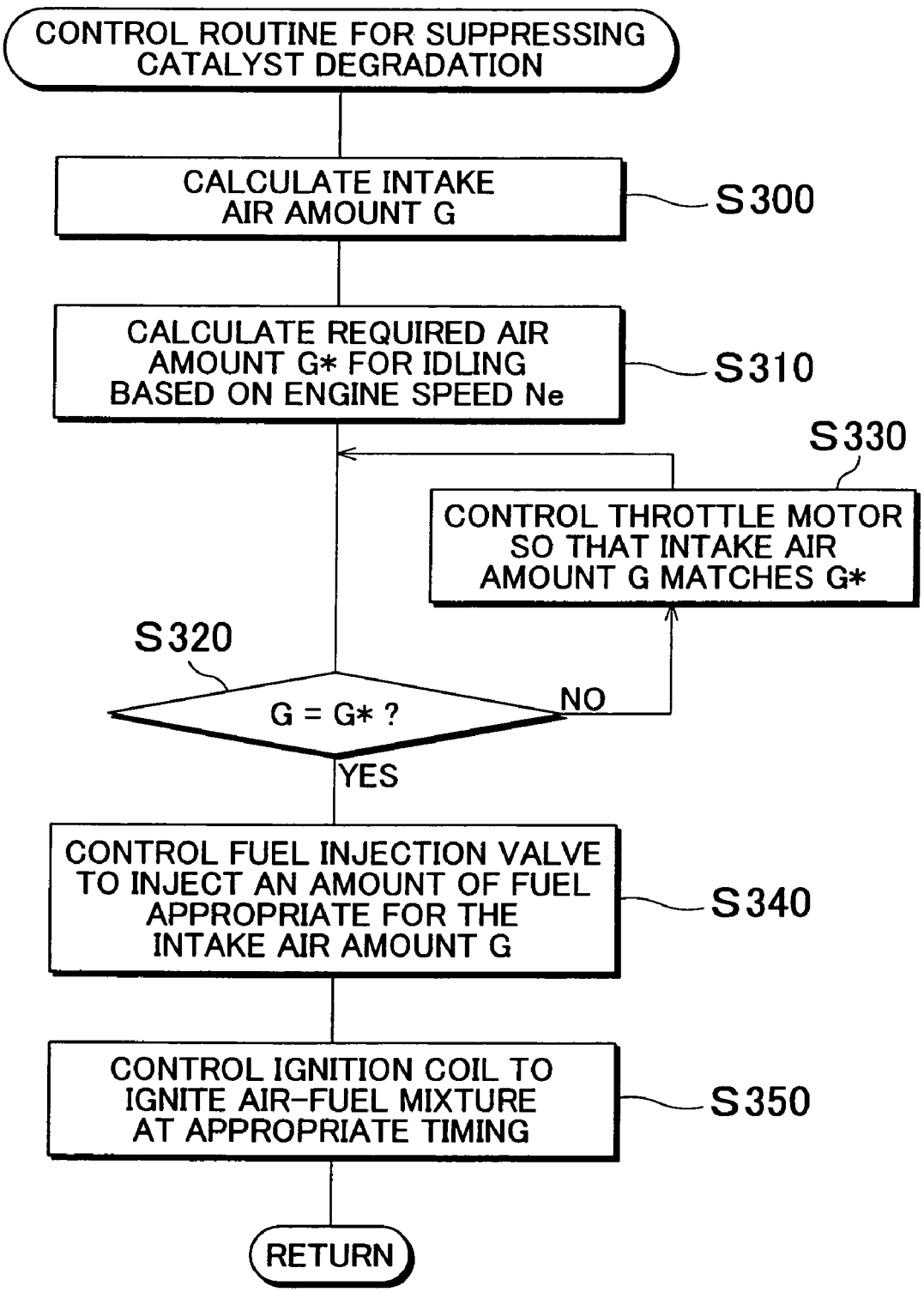
FIG. 8 is a flowchart illustrating an example of a control routine for suppressing catalyst degradation, which is executed by the engine electronic control unit according to the example embodiment.

Next, a control routine to suppress catalyst degradation which is executed by the engine ECU 24 will be described. FIG. 8 is a flowchart illustrating one example of the control routine to suppress catalyst degradation. When this control routine to suppress catalyst degradation starts, the engine ECU 24 first calculates the current intake air amount G based on the airflow meter signal from the airflow meter 148 (step S300). Then the engine ECU 24 calculates the engine speed Ne based on the signal from the crankshaft position sensor 140 and sets a required air amount G* for idling based on the calculated engine speed Ne (step S310). More specifically, the engine ECU 24 sets the required air amount G* corresponding to the actual engine speed Ne using a table for setting the required air amount shown in Table 1 below. Here, the require air amounts G1, G2, G3, . . . are values that are calculated in advance as air amounts required by the engine 22 while operating at the engine speed Ne to balance out the friction and the like in the engine 22, i.e., required by the engine 22 when idling at the engine speed Ne. The magnitude correlation is G1<G2<G3 . . . . That is, the required air amount G* is set to increase the higher the engine speed Ne. Once the required air amount G* is set in this way, the engine ECU 24 then determines whether the current intake air amount G essentially matches the required air amount G* (step S320). If the current intake air amount G does not essentially match the required air amount G*, the throttle motor 136 is operated to make it essentially match (step S330) and step S320 is performed again. If, on the other hand, the current intake air amount G does essentially match the required air amount G*, the fuel injection valve 126 is operated to inject an amount of fuel appropriate for the intake air amount G (step S340), and the ignition coil 138 is energized to generate an electric spark from the spark plug 130 at a predetermined spark timing (step S350), after which this cycle of the routine ends. Accordingly, because the engine 22 is made to idle at the current engine speed Ne such that exhaust gas after the air-fuel mixture has been combusted, and not air, passes through the exhaust gas control apparatus 134 which is at a high temperature, the exhaust gas control apparatus 134 is not exposed to a high temperature, oxygen rich atmosphere, thus enabling degradation of the catalyst to be suppressed.

TABLE 1

| Engine speed Ne (rpm) | Required air amount G* |
|---|---|
| 800~1600 | G1 |
| 1600~2400 | G2 |
| 2400~3200 | G3 |
| . | . |
| . | . |
| . | . |

Figure 9:
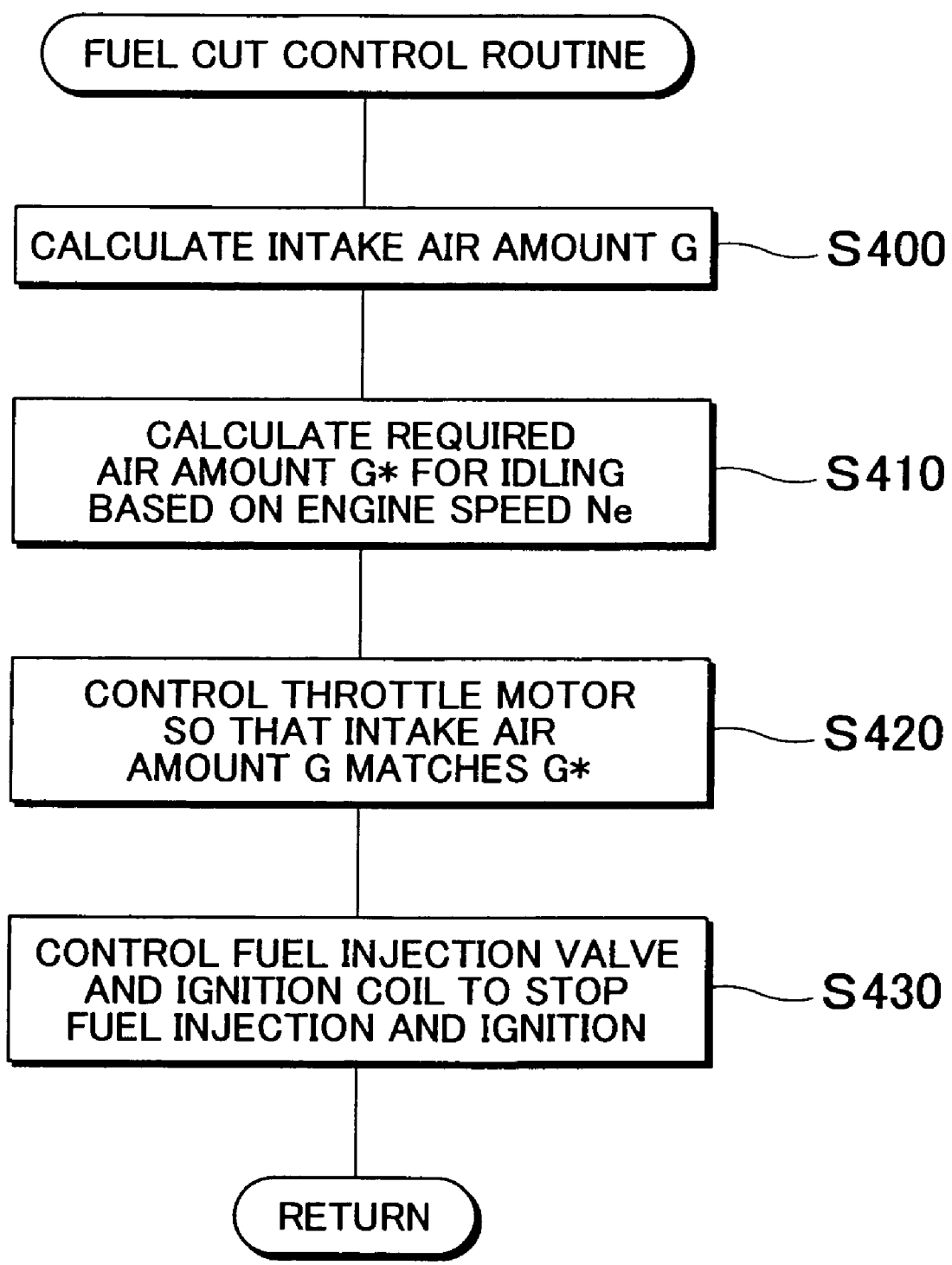
FIG. 9 is a flowchart illustrating an example of a fuel cut control routine which is executed by the engine electronic control unit according to the example embodiment.

Next, a fuel cut control routine that is executed by the engine ECU 24 will be described. FIG. 9 is a flowchart illustrating one example of this fuel cut control routine. When the fuel cut control routine starts, the engine ECU 24 first calculates the current intake air amount G based on the airflow meter signal from the airflow meter 148 (step S400). Then the engine ECU 24 calculates the required air amount G* for idling based on the engine speed Ne that was calculated based on the signal from the crankshaft position sensor 140 (step S410). More specifically, the engine ECU 24 sets the required air amount G* for idling using the table for setting the required air amount shown in Table 1 described above. Once the required air amount G* is set in this way, the engine ECU 24 then controls the throttle motor 136 so that the actual intake air amount G comes to match the required air amount G* (step S420), operates the fuel injection valve 126 to stop fuel injection, and de-energizes the ignition coil 138 to stop the spark plug 130 from generating an electric spark (step S430), after which this cycle of the routine ends. Accordingly, when the fuel cut condition is satisfied but the catalyst degradation condition is not satisfied (i.e., YES in step S140 and NO in step S150) or when the fuel cut condition, the catalyst degradation condition, and the catalyst odor producing condition are all satisfied (i.e., YES in all of steps S140, S150, and S180), the engine ECU 24 executes the fuel cut control and makes the intake air amount G at that time match the required air amount G* for when the engine 22 is made to idle at the engine speed Ne at that time. Therefore, when control to suppress catalyst degradation is executed after fuel cut control is executed, the intake air amount G already matches the required air amount G* when the engine 22 is made to idle at the engine speed Ne at that time so it is possible to smoothly shift into control to suppress catalyst degradation.

Here, the corresponding relationship between the structural elements of this example embodiment and the structural elements of the invention will be clarified. The engine 22 in this example embodiment may be regarded as an internal combustion engine of the invention, the exhaust gas control apparatus 134 may be regarded as an exhaust gas control catalyst, and the fuel injection valve 126 may be regarded as fuel injecting means. Further, the throttle valve 124 and the throttle motor 136 may be regarded as air amount adjusting means, and the hybrid ECU 70 and the engine ECU 24 may be regarded as controlling means. Also in this example embodiment, operation of the hybrid vehicle 20 illustrates one example of a vehicle control method of the invention.

According to the hybrid vehicle 20 of this example embodiment described in detail above, when it is necessary to suppress both catalyst degradation and catalyst odor when the fuel cut condition is satisfied (i.e., YES in all of steps S140, S150, and S180), the fuel cut control is executed giving priority to control for suppressing catalyst odor. At this time, the required air amount G* for idling is drawn in. Therefore, when shifting the engine 22 to an idle state in order to suppress catalyst degradation after the catalyst odor has been eliminated, the required air amount G* for idling is already being drawn in so there is no need to operate the throttle valve 124 with the throttle motor 136 to adjust the air amount. As a result, there is no time delay for adjusting the air amount. Thus, there can be a smooth shift to control to suppress degradation of the exhaust gas control catalyst after control to suppress catalyst odor has ended, giving priority to control to suppress catalyst odor over control to suppress catalyst degradation.

In the hybrid vehicle 20 according to the foregoing example embodiment, in the fuel cut control routine, the required air amount G* is calculated (step S410) and the throttle motor 136 is operated so that the intake air amount G matches the calculated required air amount G* (step S420). Alternatively, however, the engine ECU 24 may determine whether the required air amount G* calculated in step S410 is less than a predetermined small amount. If the required air amount G* is not less than that small amount, the process may proceed on to step S420. If the required air amount G* is less than the small amount, however, the required air amount G* may first be reset to that small amount before the process proceeds on to step S420. Here, the small amount is set as follows. First, the relationship between the catalyst odor, which has a correlative relationship with the total increase injection amount, and the air amount necessary to eliminate that catalyst odor may be obtained through testing or the like beforehand, and the maximum time allowed before control to suppress catalyst degradation is executed when it is necessary to execute the control to suppress catalyst degradation is obtained. The small amount is then set as the quotient of the last air amount divided by the maximum allowable time. This allows the catalyst odor to be eliminated relatively quickly so the shift can be made to the control to suppress degradation of the exhaust gas control apparatus 134.

Figure 10:
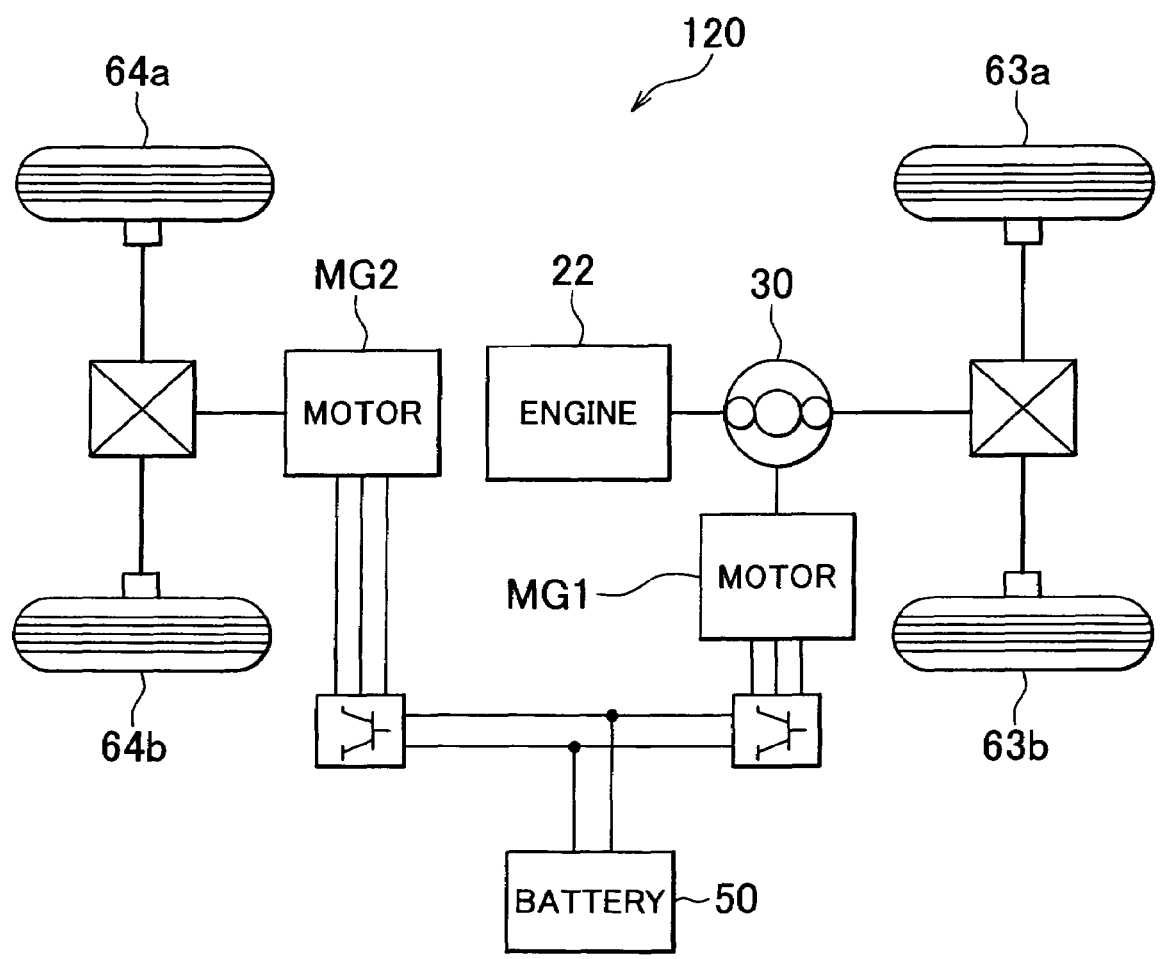
FIG. 10 is a block view schematically showing the structure of a hybrid vehicle according to a modified example of the example embodiment.

In the hybrid vehicle 20 according to the foregoing example embodiment, the power of the motor MG2 is changed and output to the ring gear shaft 32a by the reduction gear 35. Alternatively, however, as illustrated in a hybrid vehicle 120 according to a modified example shown in FIG. 10, the power of the motor MG2 may be transmitted to axles (i.e., axles to which driven wheels 64a and 64b are connected in FIG. 10) other than the axles (i.e., the axles to which the driven wheels 63a and 63b are connected) to which the ring gear shaft 32a is connected.

Figure 11:
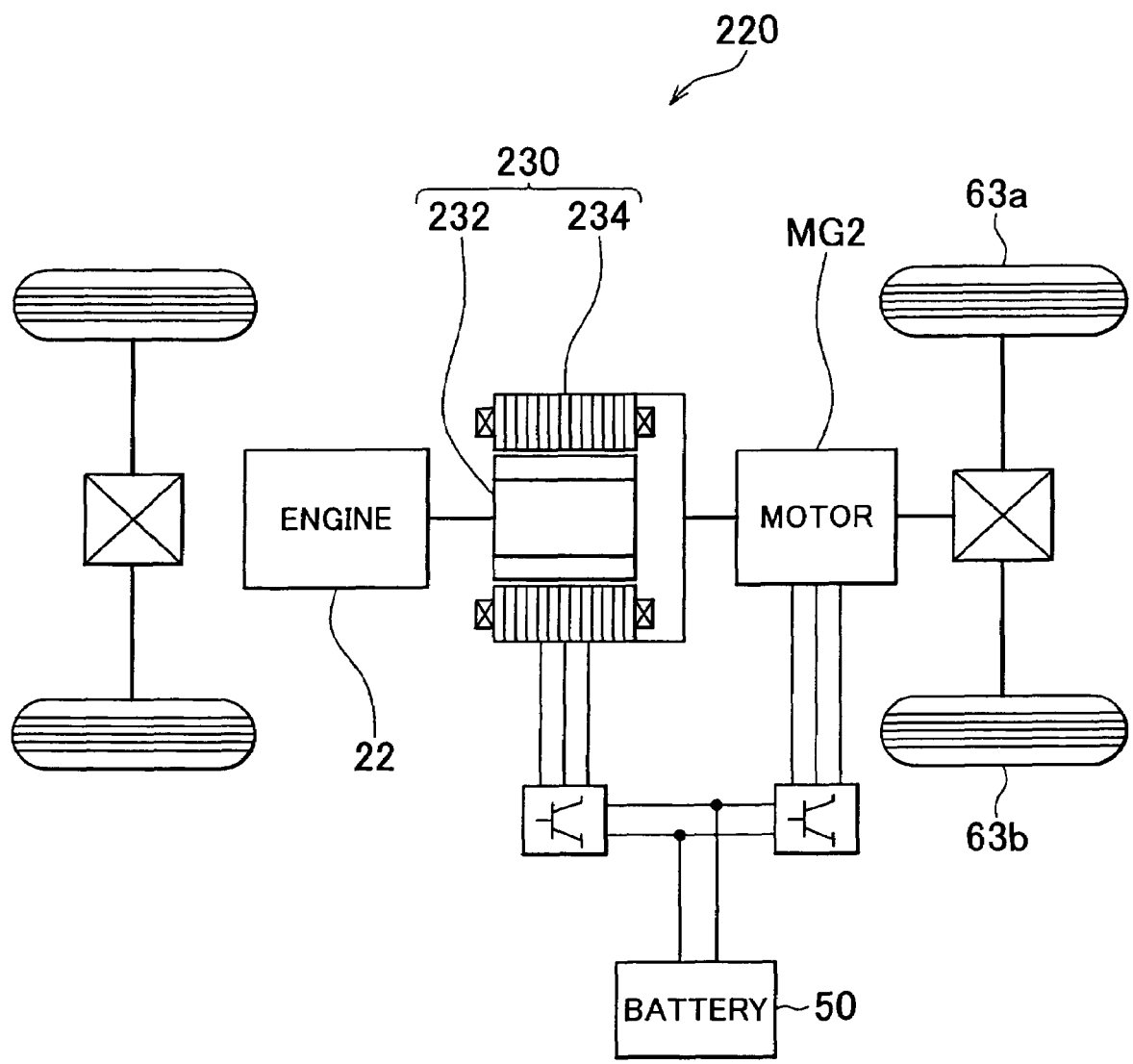
FIG. 11 is a block diagram schematically showing the structure of a hybrid vehicle according to another modified example of the example embodiment.

The hybrid vehicle 20 according to the foregoing example embodiment outputs power from the engine 22 via the power split device 30 to the ring gear shaft 32a which serves as the driveshaft that is connected to the driven wheels 63a and 63b. However, the invention may also be applied to a hybrid vehicle 220 according to a modified example shown in FIG. 11. This hybrid vehicle 220 includes a dual rotor electric motor 230 that has an inner rotor 232 connected to the crankshaft 26 of the engine 22 and an outer rotor 234 connected to the driveshaft that outputs power to the driven wheels 63a and 63b. Accordingly, the dual rotor electric motor 230 both transmits some of the power from the engine 22 to the driveshaft and converts the remaining power to electric energy.

In the foregoing example embodiment, the invention was described with respect to the hybrid vehicle 20 but it is not limited to a hybrid vehicle. That is, the vehicle may be a non-hybrid vehicle or a vehicle which is not an automobile as long as the vehicle executes the control to suppress catalyst degradation and control to suppress catalyst odor described above. In addition, the invention may also be in the form of a control method for such a vehicle.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle comprising:
   an internal combustion engine that burns a mixture of air and fuel;
   an exhaust gas control catalyst that purifies exhaust gas discharged from the internal combustion engine;
   a fuel injection apparatus that injects fuel into the internal combustion engine;
   an air amount adjusting apparatus that adjusts the amount of air drawn into the internal combustion engine; and
   a control apparatus which, when a catalyst degradation condition and a catalyst odor producing condition are satisfied when a fuel cut condition is satisfied, sets a required air amount for idling based on an operating state of the vehicle, adjusts the air amount adjusting apparatus such that the required air amount is drawn in, and controls the fuel injection apparatus such that a fuel cut is performed, and when a predetermined catalyst odor eliminated condition is satisfied thereafter, controls the fuel injection apparatus and the air amount adjusting apparatus such that the internal combustion engine idles.

2. The vehicle according to claim 1, wherein the control apparatus makes the fuel cut condition a condition in which the speed of the internal combustion engine is in a predetermined high speed region and required braking torque is being generated.

3. The vehicle according to claim 1, wherein the control apparatus makes the catalyst degradation condition a condition in which the temperature of the exhaust gas control catalyst has reached a predetermined high temperature region.

4. The vehicle according to claim 1, wherein the control apparatus makes the catalyst odor producing condition a condition in which a total increase injection amount of fuel injected from the fuel injection apparatus has reached a predetermined large amount region.

5. The vehicle according to claim 1, wherein the control apparatus makes the catalyst odor eliminated condition a condition in which a cumulative value of the amount of air drawn into the internal combustion engine for a period of time during which the fuel cut is performed has reached a predetermined large air amount region.

6. The vehicle according to claim 1, wherein the air amount adjusting apparatus includes a throttle valve mounted such that an opening amount thereof is variable in an intake pipe of the internal combustion engine, and an actuator that changes the opening amount of the throttle valve by driving the throttle valve.

7. The vehicle according to claim 1, wherein when the control apparatus sets the required air amount for idling based on the operating state of the vehicle, adjusts the air amount adjusting apparatus such that the required air amount is drawn in, and controls the fuel injection apparatus such that a fuel cut is performed, and the required air amount enters a predetermined small amount region, the control apparatus changes the required air amount to become a value that exceeds that small amount region.

8. The vehicle according to claim 1, wherein when the control apparatus sets the required air amount for idling based on the operating state of the vehicle, the control apparatus sets the required air amount for idling based on the speed of the internal combustion engine.

9. A control method for a vehicle that includes an internal combustion engine that burns a mixture of air and fuel, an exhaust gas control catalyst that purifies exhaust gas discharged from the internal combustion engine, fuel injecting means for injecting fuel into the internal combustion engine, and air amount adjusting means for adjusting the amount of air drawn into the internal combustion engine, comprising the steps of:

(a) when a catalyst degradation condition and a catalyst odor producing condition are satisfied when a fuel cut condition is satisfied, setting a required air amount for idling based on an operating state of the vehicle, adjusting the air amount adjusting means such that the required air amount is drawn in, and controlling the fuel injecting means such that a fuel cut is performed; and (b) when a predetermined catalyst odor eliminated condition is satisfied after step (a), controlling the fuel injecting means and the air amount adjusting means such that the internal combustion engine idles.

* * * * *